United States Patent
Chen et al.

(10) Patent No.: US 6,958,973 B1
(45) Date of Patent: Oct. 25, 2005

(54) OUTPUT QUEUING METHOD FOR FORWARDING PACKETS IN SEQUENCE

(75) Inventors: Jen-Kai Chen, Taipei (TW); Yu-Ju Lin, Taipei (TW); Jiann-Hwa Liou, Taichung (TW)

(73) Assignee: Via Technologies, Inc., (TW)

( * ) Notice: Subject to any disclaimer, the term of this patent is extended or adjusted under 35 U.S.C. 154(b) by 666 days.

(21) Appl. No.: 09/669,879

(22) Filed: Sep. 27, 2000

(30) Foreign Application Priority Data

Nov. 30, 1999 (TW) .............................. 88120840 A (51) Int. Cl.$^7$ ........................................... H04L 12/54
(52) U.S. Cl. ..................... 370/235; 370/390; 370/412; 370/429; 370/432
(58) Field of Search ................ 370/412, 413, 370/414, 416, 417, 390, 428, 429, 432, 235, 370/389, 392

(56) References Cited

U.S. PATENT DOCUMENTS 5,602,841 A * 2/1997 Lebizay et al. ............. 370/413
5,784,003 A * 7/1998 Dahlgren ..................... 340/2.2
6,320,861 B1 * 11/2001 Adam et al. ............. 370/395.7
6,363,075 B1 * 3/2002 Huang et al. ................ 370/412
6,574,194 B1 * 6/2003 Sun et al. .................... 370/235
6,574,232 B1 * 6/2003 Honig et al. ................. 370/413
6,625,159 B1 * 9/2003 Singh et al. ................. 370/413

OTHER PUBLICATIONS

"A Multicast Single-Queue Switch with a Novel Copy Mechanism," M.R. Hashemi and Alberto Leon-Garcia, University of Toronto, 1998 IEEE.

* cited by examiner

Primary Examiner—Seema S. Rao
Assistant Examiner—Shick Hom
(74) Attorney, Agent, or Firm—Rabin & Berdo, P.C.

(57) ABSTRACT

A output queuing method for forwarding the packets sequentially in a switching network. Each port is related to a port output queue and a global output queue is shared by all port output queues. A FIFO (First In First Out) block is allocated into each port output queue and the global output queue. The FIFO block contains a number of FIFO nodes. Based on the type and destination ports of the received packet, the fields of the related FIFO node in the port output queue and the global output queue are set. The packets are sent out or skipped based on the related fields.

23 Claims, 4 Drawing Sheets

OUTPUT QUEUING METHOD FOR FORWARDING PACKETS IN SEQUENCE

BACKGROUND OF THE INVENTION

This application incorporates by reference Taiwanese application Serial No. 88120840, Filed Nov. 30, 1999.

FIELD OF THE INVENTION

The invention relates in general to the output queuing method for forwarding packets in sequence, and more particularly to the output queuing method for forwarding packets in sequence in Ethernet switching network.

DESCRIPTION OF THE RELATED ART

A general Ethernet switching network may contain hundreds of ports, and the ports may be Ethernet ports or central processing unit (CPU) ports.

In the Ethernet switching network, data is forwarded either from the Ethernet port to the Ethernet port or from the CPU port to the Ethernet port. During the process of data forwarding, data is forwarded in form of packets. The packet represents individual information including addresses, control signals, data signals and so on. The packet is considered as a unit in the communication network, which is to say, the ports of the Ethernet switching network send data in packets to each other. Accordingly, the packet is forwarded to destination ports of the packet.

Based on the number of destination ports related to the packet, there are three basic types of packets: (1) unicast packet; (2) multicast packet; and (3) broadcast packet. In the case of the unicast packet, there is only one destination port. In the case of the multicast packet, there are more than one destination port. In the case of the broadcast packet, all ports of the Ethernet switching network are used as the destination ports. For example, in a switching network of 17 ports, a broadcast packet has 16 destination ports while a multicast packet has 2~15 destination ports, depending on different situations.

In the Ethernet switching network, there are two control modules, the input control and the output control. The input control is used in processing packet input while the output control is used in processing packet output. Each port has its related input control and output control. The input control and output control are independent of each other.

When the packet is forwarded to its destination port, the packet is allocated in the port output queue of the destination port. In fact, the port output queue is made by linking the packet buffers whereby the packet is temporarily stored in the packet buffer. The packet stored in the packet buffer is at most of 1518 bytes. A link node, used in the packet forwarding procedure, is used for storing other data, for example, the packet size, the destination-port bit mask, and the pointer.

The packet size contains information, usually in bytes, concerning the size of the packet, whereas, the destination-port bit mask contains information concerning the destination port of the packet. For example, in the case of a switching network with 16 Ethernet ports and one CPU port, the destination-port bit mask is of 17 bits. Each bit in the destination-port bit mask is associated to one port. If the bit in the destination-port bit mask is 1, it means that the port related to the bit is the destination port. In other words, if there are five bits of 1 in the destination-port bit mask, then the packet has five destination ports.

The pointer is used for pointing the next link node to be used. That is to say, the link between the link nodes is achieved by the pointer.

The input control for processing the packet input of the port includes the following steps:
(1) obtaining the destination-port bit mask by looking up tables;
(2) allocating a free packet buffer for storing the input packet; and
(3) enqueuing the input packet into the port output queue of the port.

The output control for processing the packet output of the port includes the following steps:
(1) dequeuing an output packet from the port output queue;
(2) sending out the output packet; and
(3) releasing the packet buffer of the output packet.

In a switching network with a memory-share structure, all free packet buffers are allocated in a free list in the beginning.

It is supposed that there are 10 packets to be forwarded. The 10 packets are numbered from 1 to 10 according to some characteristic, for example, time sequence. For some port, the packets to be received must be 1, 5, 8, and 9. If the packets are forwarded to the destination port in a wrong sequence, for example, 1, 8, 5, and 9, then a sequence error or a data error occurs in the port.

Therefore, a suitable method should be applied in forwarding the packets in sequence into the destination port. For example, the FIFO (First In First Out) method is one of the suitable methods used in forwarding the packets in sequence.

In a switching network suitable in forwarding the packet in sequence, the input control includes:
(1) obtaining the destination-port bit mask by looking up tables;
(2) allocating a free packet buffer for storing the input packet; and
(3) enqueuing the input packet into the output queue with the smallest port identification number according the destination-port bit mask.

In a switching network suitable in forwarding the packet in sequences, the output control includes:
(1) dequeuing an output packet from the related port output queue;
(2) sending out the output packet;
(3) resetting (or clearing) the related bit of the destination-port bit mask; and
(4) if the bits of the destination-port bit mask are all zero, then releasing the packet buffer of the output packet into the free list; else enqueuing the output packet into the smallest port identification number according to the destination-port bit mask.

However, the above conventional method has a major disadvantage of taking a long period on forwarding the packets in sequence. Therefore, there is another conventional method that takes a shorter period on forwarding the packets in sequence.

Figure 1A:
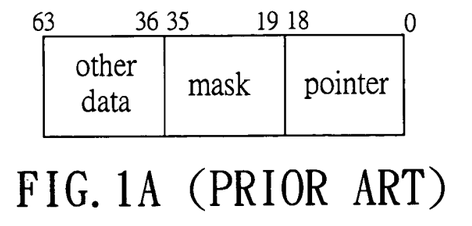
FIG. 1A shows a data structure for a unicast link-node according to a conventional method.
Figure 1B:
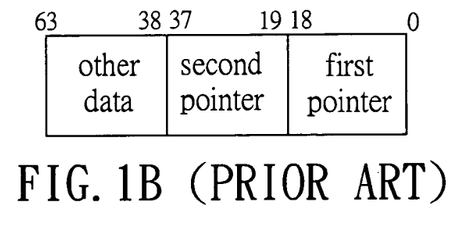
FIG. 1B shows a data structure for a multicast link-node according to a conventional method.

The second conventional method is called "link-node duplication method". In the second conventional method, the link-node is divided into two types: unicast link-node and multicast link-node. In the following description, the link-node is of 64 bits. FIGS. 1A and 1B respectively show the structures of the unicast link-node and the multicast link-node in the second conventional method.

As shown in FIG. 1A, the unicast link-node includes three fields: a pointer field, a destination-port bit mask field and an "other data" field. The pointer field ranges from bits 0~18. The destination-port bit mask field ranges from bits 19~35. The "other data" field ranges from bits 36~63. Similarly, as shown in FIG. 1B, the multicast link-node includes a first pointer field, a second pointer field and "other data" field. The first pointer field ranged from bits 0~18. The second pointer field ranges from bits 19~37. The "other data" field ranges from bits 38~63.

A unicast link-node of 64 bits is one-to-one related to a packet buffer of 1.5k bytes. The unicast link-node is statically directed to the packet buffer. It is supposed that all unicast link-nodes are sequentially numbered, and so are multicast link-nodes and packet buffers. That is to say, the j-th unicast link-node is statically related to the j-th packet buffer. On the other hand, the multicast link-node is dynamically related to the packet buffer.

When the packet buffer is related to the unicast link-node, the packet buffer is used for storing the unicast packet. Similarly, when the packet buffer is related to the multicast link-node, the packet buffer is used for storing the multicast packet or the broadcast packet.

In the conventional method, when one unicast packet is forwarded, one packet buffer and one unicast link-node are used. It is supposed that a multicast packet has k destination ports. When one multicast packet is forwarded, one packet buffer, one unicast link-node and k multicast link-node are used.

The way for forwarding a broadcast packet is similar to that for forwarding a multicast packet in this conventional method. In a switching network with N ports, one packet buffer, one unicast link-node and N-1 multicast link-node are used in forwarding one broadcast packet.

When a multicast packet is forwarded, the input control includes the following steps:

(1) obtaining the destination-port bit mask by looking up tables;

(2) allocating a packet buffer in the free list for storing the multicast packet;

(3) setting the destination-port bit mask of the unicast link-node, wherein the destination-port bit mask is directed to the destination ports of the multicast packet;

(4) allocating k multicast link-nodes in the free list dynamically related to the packet buffer; and (5) enqueuing the k mulicast link-nodes into the respective output queue of the k destination ports.

When a unicast packet is forwarded, the input control includes:

(1) obtaining the destination-port bit mask by looking up tables;

(2) allocating a packet buffer in the free list for storing the unicast packet;

(3) allocating a unicast link-node related to the packet buffer in step (2); and (4) enqueuing the unicast link-node into the output queue of the destination port.

When an output packet is released from the output queue, the output control includes the following steps:

(1) dequeuing an output packet from the output queue;

(2) sending out the output packet;

(3) if the link-node is a unicast link-node, releasing the packet buffer related to the output packet into the free list;

(4) if the link-node is a multicast link-node and the destination-port bit mask of the related unicast link-node has only one bit of 1, then releasing the multicast link-node and the packet buffer into the free list; and (5) if the link-node is a multicast link-node and the destination-port bit mask of the related unicast link-node has two or more bits of 1, then clearing the related bit in the destination-port bit mask of the unicast link-node and releasing the multicast link-node.

In the conventional method, when the multicast packet has already been forwarded to some destination port, the related bit in the destination-port bit mask is cleared (or reset) as 0. Therefore, the number of bit(s) of 1 represents the number of destination ports that the multicast packet is not forwarded yet.

Therefore, in the step (4) of the output control, when the destination-port bit mask of the unicast link-node has only one bit of 1, it represents that the multicast packet already leaves only one destination port to be forwarded. Then, the packet buffer and the unicast link-node can be released into the free list.

As mentioned above, the unicast link-node includes the pointer, the destination-port bit mask, and other data. When the unicast link-node is used in forwarding the unicast packet, the pointer points to the next unicast packet of the port. When the unicast link-node is used in forwarding the multicast packet, the destination-port bit mask of the unicast link-node is directed to the destination ports of the multicast packet. When the multicast packet is forwarded to the destination port, and the multicast packet is to be dequeued, the bit in the destination-port bit mask, which is related to the destination port, is cleared.

The multicast link-node of FIG. 1B includes a first pointer, a second pointer and other data. The first pointer is used to point to the next link-node of the output queue. The second pointer is used to point to the related unicast link-node.

In general, the performance for the output queuing method is related to the allocation times, release times, enqueuing times, and dequeuing times. Table 1 shows the total operation times of the conventional method on forwarding the multicast packet with k destination port.

TABLE 1

| The multicast packet with k destination port | Operation times |
|---|---|
| Allocation | 1 + k |
| Releasing | 1 + k |
| Enqueuing | k |
| Variation | Read :k; Write (clear):k − 1 |
| Dequeuing | k |

The item "variation" represents the variation on bits in the destination-port bit mask. The term "read" represents the read operation performed on the related bits, so it takes k times to complete the read operation on the related bits. Similarly, the term "write" or "clear" represents the write operation performed on the related bits. As mentioned above, when there is only one related bit of 1, the multicast link-node and the packet buffer are released. That is to say, there is no need to clear the last "1" bit, so it takes k−1 time(s) to complete the write (clear) operation on the related bits.

As shown in Table 1, it takes (1+k)+(1+k)+k+k+(k−1)+k=6k+1 operation times in forwarding a multicast packet with k destination ports. Therefore, a high memory bandwidth is needed to meet so many operation times.

SUMMARY OF THE INVENTION

It is therefore an object of the invention to provide an improved and simplified output queuing method for forwarding packets in sequence. The invention discloses an output queuing method for forwarding packets in a switching network, wherein a global output queue, shared by port output queues related to ports in the switching network is used for forwarding multicast packets.

The invention achieves the above-identified object by providing a new output queuing method for forwarding the packets in sequence. The output queuing method is used in a switching network containing a number of ports. Each port is related to a port output queue while a global output queue is shared by all port output queues. A plurality of FIFO (First In First Out) blocks are allocated to all of the port output queues and the global output queue. The FIFO block contains a number of FIFO nodes. In one embodiment of the output queuing method, each FIFO node contains a skip field and a multicast count field (or a port mask field). In the method, the type and the destination port of the received packet are determined. The skip field and the multicast count field (or port mask field) of the related FIFO node in the port output queue or the global output queue are then set according to the type of the received packet. The packet is sent out or skipped from the port output queue/global output queue based on the value in the skip field and the multicast count field.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

The embodiment is applied in the Ethernet switching network. Of course, the invention is not limited to the Ethernet switching network. By proper adaptation, the invention may be applied to other network. It is supposed that the Ethernet switching network has N ports with each port having its own port output queue. A global output queue is shared by all port output queues.

Figure 2:
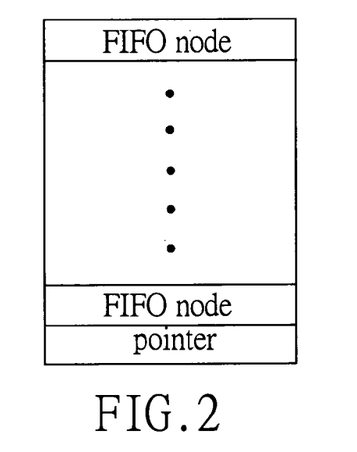
FIG. 2 shows a data structure for a FIFO (First In First Out) block in one embodiment of the invention.

In this embodiment, a FIFO (First In First Out) block is considered as a basic element in the output queue. FIG. 2 shows a data structure of the FIFO block. As shown in FIG. 2, a FIFO block includes Nb FIFO nodes and a pointer, wherein Nb is a natural number. All the FIFO nodes in the FIFO block are numbered from 1 to Nb in top-down direction sequentially. The pointer in the FIFO block is used for pointing to the next FIFO block. All the FIFO blocks are sequentially numbered from 1. The j-th FIFO node of the k-th FIFO block is designated as packet parameter (k, j). Each FIFO node is directed to a packet buffer. Therefore, the FIFO node with the packet parameter (k, j) is directed to the (k*Nb+j)-th packet buffer. In the embodiment, the FIFO nodes in the same FIFO block are considered as successive. The last FIFO node is linked to the first FIFO node of the next FIFO block via the pointer.

Initially, all FIFO blocks are linked together as a free list. Then, the queue control allocates one free FIFO block to each port output queue and another free FIFO block to the global output queue. Accordingly, each port output queue and the global output queue are both provided with Nb free packet buffers. The unicast packet is allocated in the port output queue, and the multicast packet is allocated in the global output queue. The relationship between the queue control and the input control/output control is similar to the server/client structure. The rough relationship is stated as following: when the output control sends out a dequeuing request, the queue control provides a dequeuing operation to the output control. Similarly, when the input control sends out an enqueuing request, the queue control provides an enqueuing operation to the input control.

In the process of forwarding a packet, the FIFO nodes are sequentially occupied by the packets to be forwarded. After all FIFO nodes in the same FIFO block are occupied, the queue control allocates a new FIFO block immediately. If the packet is already forwarded to the destination port, the packet is released and so is the FIFO node originally occupied by the packet. After all FIFO nodes in the same FIFO block are released, the queue control releases the FIFO block into the free list. How the FIFO node and the FIFO block are released is describe later.

In the embodiment, the packets are divided as two types: the unicast packet and the multicast packet. The broadcast packet is considered the same as the multicast packet in the embodiment. In a group of packets to be forwarded, these two types of packets are either adjacent or alternating. That is to say, for some port, if the previous packet is a unicast packet, the next packet may be another unicast packet or a multicast packet. Similarly, if the previous packet is a multicast packet, the next packet may be a unicast packet or another multicast packet.

In the queue control, there are, respectively, four registers related to each port output queue. The four registers are the "output skip count" register, the "output multicast count" register, the "input skip count" register, and the "input multicast count" register. As mentioned above, the port output queue is used for placing the unicast packet. Accordingly, the four registers are related to the unicast packet.

The "output skip count" register is used for indicating how many multicast packets following the unicast packet are to be skipped. The "output multicast count" register is used for indicating how many multicast packets following the unicast packet are to be dequeued. The "output multicast count" register is used to confirm whether a dequeue operation is necessary or not. The "output skip count" register and the "output multicast count" register are taken into consideration together. It is provided that the "output skip count" register and the "output multicast count" register are, respectively, 3 and 6. This means that there are 9 multicast packets between two unicast packets. In the 9 multicast packets, the first 3 multicast packets are to be skipped, and the last 6 multicast packets are to be dequeued. The "output skip count" register and the "output multicast count" register are used in dequeuing the packet.

The "input skip count" register is used for indicating how many multicast packets following the unicast packet are to be skipped. The "input multicast count" register is used for indicating how many multicast packets following the unicast packet are enqueued. The "input multicast count" register is used to confirm whether an enqueue operation is necessary or not. The "input skip count" register and the "input multicast count" register are taken into consideration together. It is provided that the "input skip count" register and the "input multicast count" register are, respectively, 3 and 6. This means that there are 9 multicast packets between the unicast packet and the next unicast packet. In the 9 multicast packets, the first 3 multicast packets are skipped, and the last 6 multicast packets are enqueued. The "input skip count" register and the "input multicast count" register are used in enqueuing the packet.

Figure 3:
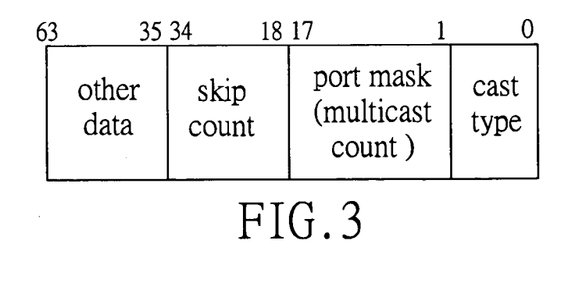
FIG. 3 shows a data structure for a FIFO node in the embodiment of the invention.

FIG. 3 shows a data structure of a FIFO node in 64 bits. In the embodiment, the FIFO node is divided into four fields: the cast type field, the port mask field (or the multicast count field), the skip count field and other data field. The 64 bits are sequentially numbered from 0 to 63, as shown in FIG. 3. The cast type field is in bit 0. The port mask field (or the multicast count field) ranges from bits 1~17. The skip count field ranges from bits 18~34. The other data field ranges from bits 35~63.

The cast type field is used to indicate the packet type stored in the packet buffer related to the FIFO node. If the cast type is 0, the packet stored in the packet buffer is a unicast packet, and if the cast type is 1, the packet stored in the packet buffer is a multicast packet.

The usage of the second field depends on the cast type. When the cast type is 0, the second field is used as a multicast count field whereas if the cast type is 1, the second field is used as a port mask field. The multicast count field indicates how many multicast packets are to dequeued and the port mask field indicates which ports in the switching network are the destination ports of the multicast packet. In the embodiment, only a packet buffer and a FIFO node are needed in forwarding a packet, regardless in forwarding the unicast packet or the multicast packet.

The skip count field indicates how many multicast packets are to be skipped. It is provided that the "input skip count" register and the "input multicast count" register are, respectively, 3 and 6. This means that there are 9 multicast packets between the unicast packet and the next unicast packet. In the 9 multicast packets, the first 3 multicast packets are skipped, and the last 6 multicast packets are dequeued. Combining the skip count field and the continuity of the FIFO nodes, the operation times in dequeuing a multicast packet from the global output queue are reduced less than N, wherein N is the number of all ports in the Ethernet switching network. The other data field is reserved.

Initially, the "input skip count" register and the "input multicast count" register are both reset as 0. For a multicast packet with k destination ports (k=2~N), the queue control performs the following steps:

(1) If the j-th port is not the destination port of the multicast packet, the queue control performs different operations according to the value in the "input multicast count" register of the j-th port. For simplicity, the "input multicast count" register of the j-th port is marked as the j-th "input multicast count" register, and the other registers are marked in a similar way. If the j-th "input multicast count" register is 0, the j-th "input skip count" register is incremented by 1.

If the j-th "input multicast count" register is not 0, the j-th "input multicast count" register is incremented by 1.

(2) If the j-th port is one of the destination ports of the multicast packet, the j-th "input multicast count" register is incremented by 1.

When a unicast packet is enqueued into some port output queue, the unicast packet is followed by a few multicast packets. When a FIFO node of a multicast packet is enqueued into the global port queue, the multicast count field and the skip count field of the last FIFO node in each port output queue are set. After a next unicast packet is enqueued, it is known that how many multicast packets follow the previous unicast packet.

When the next unicast packet is enqueued into the port output queue, the value in the "input skip count" register of the port is set into the skip count field of the previous unicast packet and the value in the "input multicast count" register of the port is set into the multicast count field of the previous unicast packet. The "input skip count" register and the "input multicast count" register are then both reset to 0 again.

When a FIFO node is dequeued from a port output queue, the skip count field of the FIFO node is written into the "output skip count" register of the port while the multicast count field of the FIFO node is written into the "output multicast count" register of the port.

Figure 4:
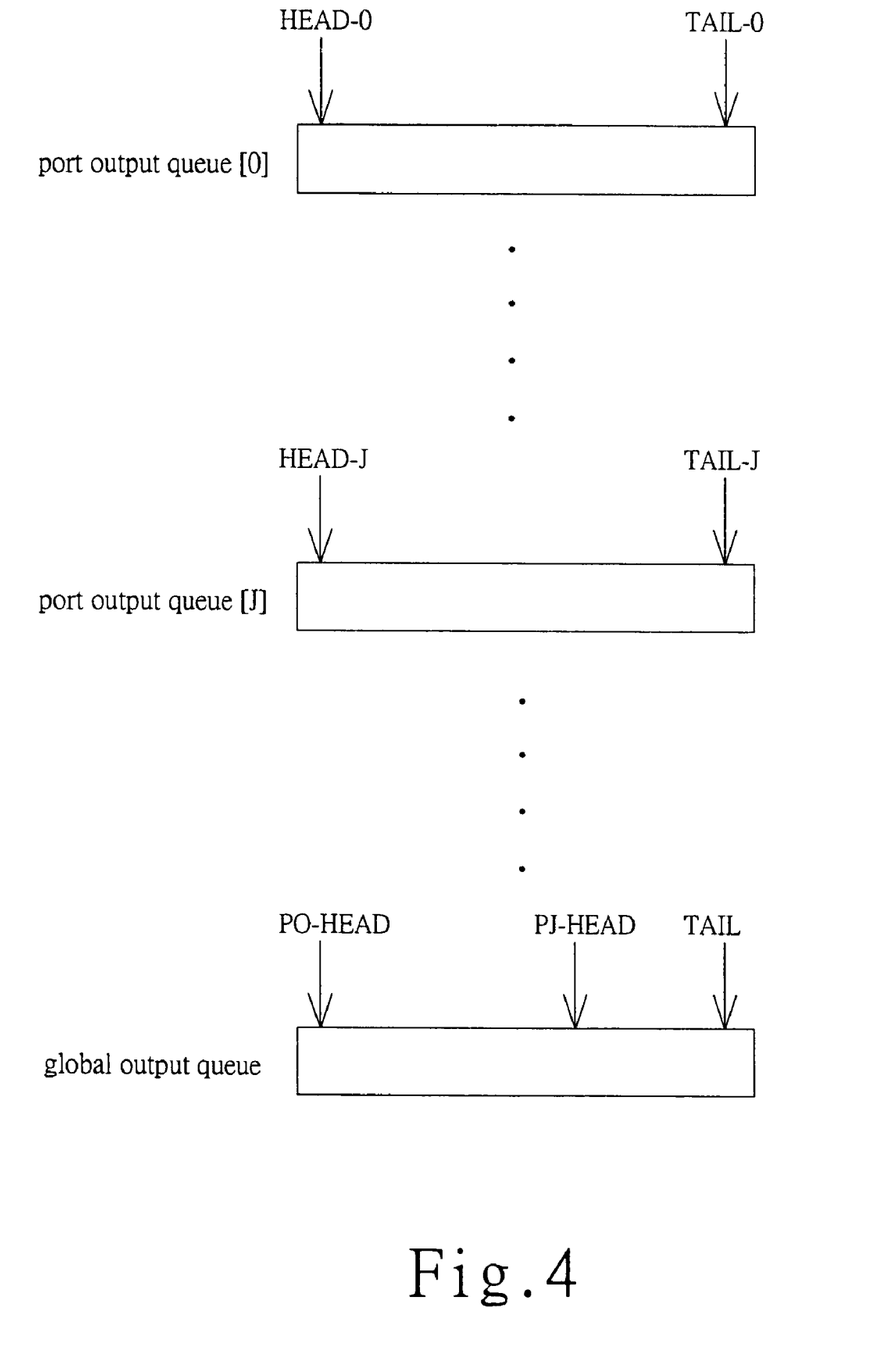
FIG. 4 shows the data structure for the output queue in the embodiment of the invention.

FIG. 4 shows a data structure of the port output queue and the global output queue in the embodiment. In FIG. 4, the port output queue j (j=0~N-1) represents the the port output queue [j]. The port output queue j includes a head pointer HEAD-j and a tail pointer TAIL-j. The head pointer HEAD-j is used to indicate the next FIFO node to be dequeued from the port output queue [j] while the tail pointer TAIL-j is used to indicate the next FIFO node to be enqueued into the port output queue [j]. As shown in FIG. 4, the global output queue includes N head pointers pj-HEAD and a tail pointer TAIL. The head pointer pj-HEAD in the global output queue is uniquely related to the port output queue [j]. The head pointer pj-HEAD points the next FIFO node to be dequeued from the global output queue. The positions and the operations of those head pointers pj-HEAD are independent. The tail pointer TAIL in the global output queue is shared by all port output queues and is used to indicate the next FIFO node to be enqueued into the global output queue.

Figure 5:
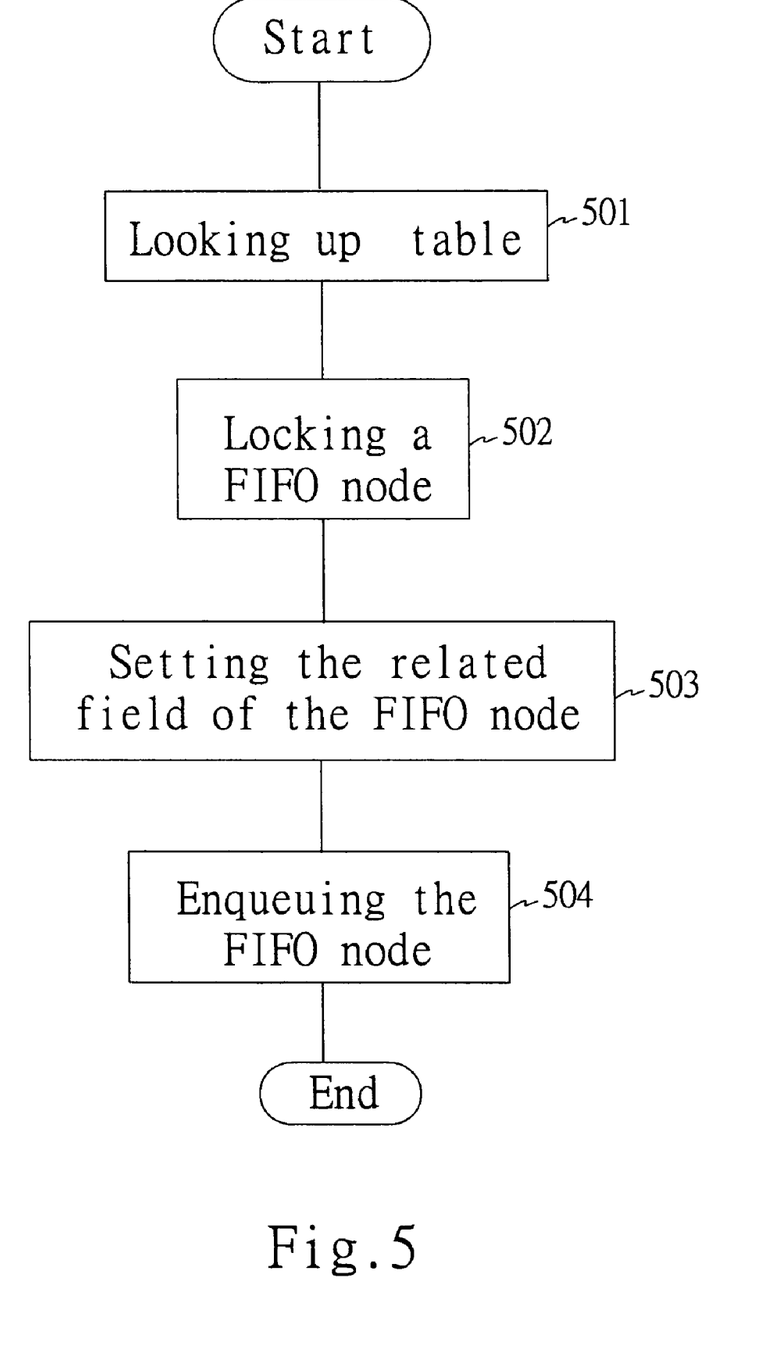
FIG. 5 shows a flow chart of the input control in the embodiment of the invention.

FIG. 5 shows a flow chart of the input control in the embodiment. Now referring to FIG. 5, first, the cast type and the destination port of the packet are obtained from a table, as shown in step 501.

The input control then sends out a demand to the queue control for locking a FIFO node, as shown in step 502. If the packet is a unicast packet, a FIFO node in the port output queue of the destination port is locked. On the other hand, if the packet is a multicast packet, a FIFO node in the global output queue is locked.

Next, the fields in the FIFO node are set as shown in step 503. If the packet is a unicast packet, the cast type field is set as 0, and the queue control sets values of the "input multicast count" register and the "input skip count" register into the "multicast count" field and the "skip count" field of the FIFO node. If the packet is a multicast packet, the cast type field is set as 1, and the destination port field is set according to the destination ports of the multicast packet. Each bit in the destination port field is one-to-one related to one port. If some port is one of the destination ports of the multicast packet, the related bit is set as 1. On the other hand, if some port is not the destination port of the multicast packet, the related bit is set as 0.

The FIFO node is then enqueued into the port output queue or the global output queue as shown in the step 504. If the packet is a unicast packet, the FIFO node is enqueued into the port output queue; and the tail pointer TAIL-j points to where the FIFO node is enqueued. If the packet is a multicast packet, the FIFO node is enqueued into the global output queue; and the tail pointer TAIL-j points to where the FIFO node is enqueued. The last FIFO node of each port output queue and the global output queue is stored in the IC to reduce the access time. When a next FIFO node is enqueued, the previous FIFO node is stored into the memory.

Figure 6:
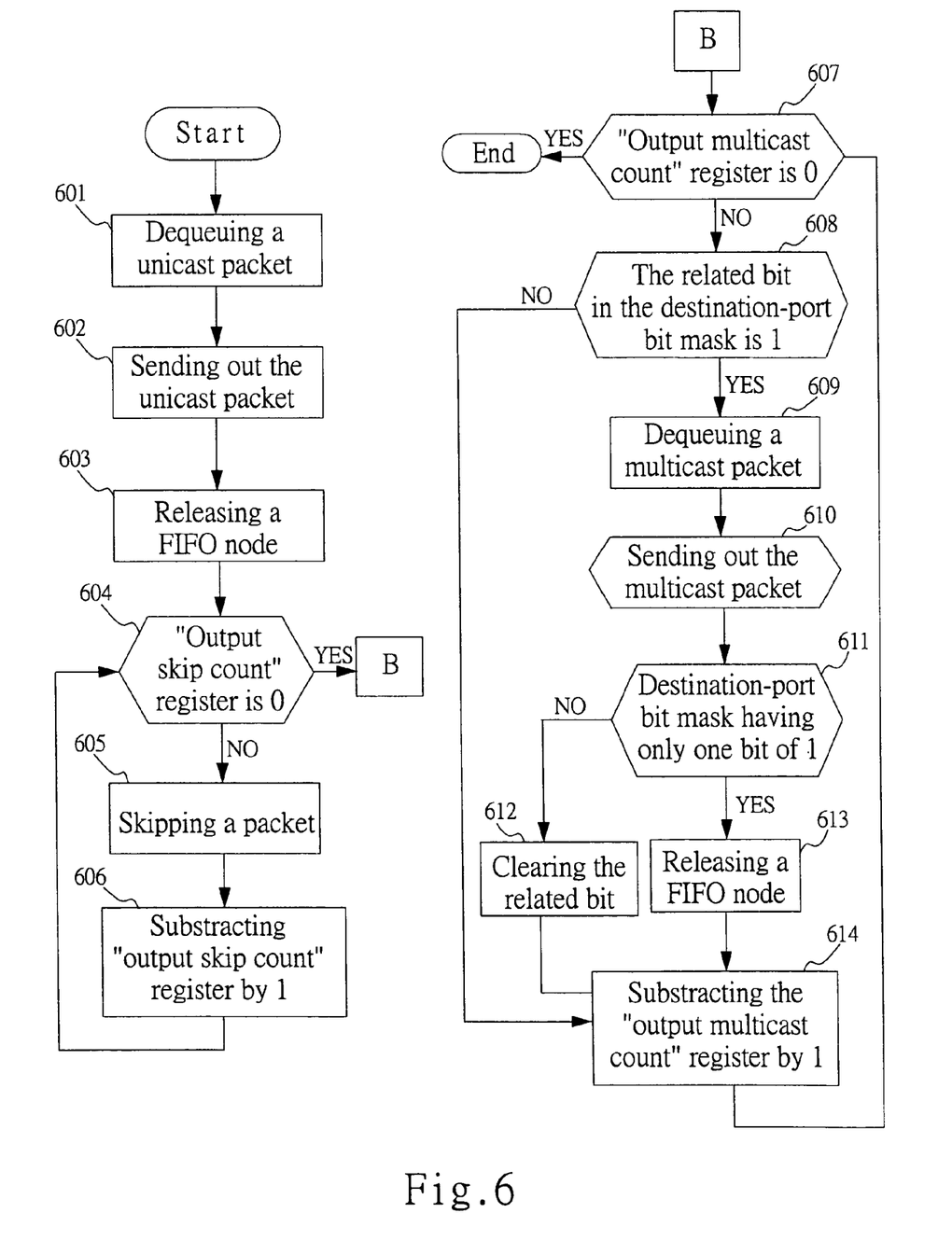
FIG. 6 shows a flow chart of the output control in the embodiment of the invention.

If there is any unicast packet and/or multicast packets following the unicast packet to be dequeued from the port output queue or from the global output queue, the output control performs the steps in FIG. 6. For simplicity, a unicast packet and the multicast packets following the unicast packet are together called as a packet group. The following multicast packets are defined from the multicast packets between two unicast packets. Of course, in some case, the packet group may only contain one unicast packet. That is because the unicast packet is followed by another unicast packet.

First, the output control dequeues a unicast packet from the port output queue as shown in step 601.

The unicast packet is then sent out as shown in step 602.

Since the unicast packet has been sent out, the packet buffer used for storing the unicast packet is released into the free list and the FIFO node corresponded to the packet buffer is also released as shown in step 603. As mentioned above, there are Nb FIFO nodes in the FIFO block and the FIFO block is not released until all FIFO nodes in this FIFO block are released.

The output control then performs the dequeuing and sending out of the multicast packets. The dequeuing and sending out steps are stated as follows:

The queue control detects whether the value in the "output skip count" register is 0 or not as shown in step 604. The value in the "output skip count" register represents how many multicast packets are to be skipped. If the value in the "output skip count" register is not 0, the output control performs step 605. If the value in the "output skip count" register is 0, the output control performs the step 607.

In step 605, one packet is skipped from the global output queue. The value in the "output skip count" register is then reduced by 1 as shown in step 606. In FIG. 6, steps 604, 605, and 606 are repeated until the value in the "output skip count" register becomes 0. Since steps 604, 605, and 606 are used in skipping the multicast packets, these three steps are also called the skip steps.

In the step 607, the queue control detects whether the value in the "output multicast count" register is 0. If the value in the "output multicast count" register is 0, then there is no multicast packet to be dequeued in the current packet group, and the output control may continue to process the next packet group. If the value in the "output multicast count" register is not 0, then there is (or are) some multicast packet(s) to be dequeued from the global output queue, and the output control continues with step 608.

In step 608, the queue control checks the related bit in the destination-port bit mask of the FIFO node in the global output queue to identify whether the output control has to dequeue the multicast packet from the global output queue. If the related bit is 1, it means that the port is one of the destination ports of the multicast packet and the output control jumps to step 609. If the related bit is 0, it means that the port is not the destination port of the multicast packet, and the output control jumps to step 614.

In step 609, the queue control informs the output control to dequeue the multicast packet from the global output queue.

In step 610, the multicast packet, which is dequeued in the step 609, is then sent out.

In step 611, the output control judges whether the destination-port bit mask of the FIFO node in the global output queue has only one bit of 1. In the embodiment, when a multicast packet is dequeued and sent out from one of its destination ports, the related bit in the destination-port bit mask of the FIFO node is reset as 0. Therefore, if there is only one bit of 1 in the destination-port bit mask, the multicast packet is already dequeued and sent out from all destination port. The output control jumps to step 613. If there are two or more bits of 1, the multicast packet is not dequeued and sent out from all destination ports yet, and the output control jumps to step 612.

In step 612, the related bit in the destination-port bit mask of the FIFO node is reset (or cleared) as 0. The reset step means the multicast packet is dequeued and sent out from the port output queue of the destination port.

In step 613, the packet buffer used for storing the multicast packet is released and the FIFO node in the global output queue is also released. As mentioned above, in the case of only one bit of 1 in the destination-port bit mask of the FIFO node, the multicast packet is already dequeued and sent out from all destination ports. Accordingly, the packet buffer for storing the multicast packet is released and so is the FIFO node, which is used to indicate the destination ports of the multicast packet, in the global output queue. There are Nb FIFO nodes in the FIFO block and the FIFO block is not released until all FIFO nodes in this FIFO block are already released.

In step 614, the value in the "output multicast count" register is reduced by 1. If step 608 directly jumps to step 614, i.e., the related bit of the destination-port bit mask is 0, the port is not one of the destination ports of the multicast packet. Accordingly, the queue control jumps the dequeuing steps and the sending out steps. By jumping these steps, the output control skips the multicast packet.

The output control repeats steps 607~614 until all multicast packets in the packet group is dequeued (or skipped) from the global output queue.

In the flow chart in FIG. 6, the steps are executed sequentially for simplicity. In practice, some steps may be performed in pipeline mode to improve processing rate. For example, assuming some packet has a large packet length which would take a long period to forward the long multicast packet. The sending out steps are then executed in conjunction with the dequeuing steps of the next packet in order to improve the rate of processing.

The performance between the invention and the prior art on forwarding a multicast packet with k destination ports are compared in Table 2.

TABLE 2

| the multicast packet with k destination port | The prior art | The invention |
| --- | --- | --- |
| Allocation operations | 1 + k | 1/Nb |
| Releasing operations | 1 + k | 1/Nb |
| Enqueuing operations | K | 1 |
| Variation operations | Read :k; Write :k − 1 | Read :k; Write :k − 1 |
| Dequeuing operations | K | N |

In Table 2, k represents the number of the destination ports of the multicast packet. Nb is the number of the FIFO nodes in a FIFO block. N is the number of the ports (the Ethernet port and the CPU port) in the Ethernet switching network.

From Table 2, the allocation operations and the releasing operations are greatly improved from (1+k) to (1/Nb). In addition, the invention utilities the "skip count" register on reducing the dequeuing operation.

One characteristic of the invention relies on a global output queue shared by all port output queues. All multicast packets/broadcast packets are stored in the global output queue. Each port output queue may fetch the desirable multicast packets.

Another characteristic of the invention relies on a queue control. The queue control provides the enqueuing operations to the input control and the dequeuing operations to the output control.

Still another characteristic of the invention relies on a FIFO block used as the component of the port output queue and the global output queue. The FIFO block contains Nb FIFO nodes and a pointer. The access operation is improved by the continuity of the FIFO nodes in the same FIFO block.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An output queuing method for forwarding packets in a switching network, the switching network containing a plurality of ports, each port corresponding to a port output queue, a global output queue shared by all port output queues, a plurality of first in first out, FIFO, blocks allocated to all of the port output queues and to the global output queue, each of the FIFO blocks comprising Nb FIFO nodes and a pointer, Nb being a natural number, each FIFO node comprising a first field and a second field, the output queuing method comprising:

receiving a packet and identifying the type and the destination port of the received packet so as to enqueue a FIFO node relating to the received packet into one of the global output queue and the port output queues;

if the received packet is a unicast packet, setting the first and second fields of a unicast FIFO node in the port output queue of the destination port, wherein the unicast FIFO node is regarded as the FIFO node relating to the received packet enqueued into the port output queue of the destination port;

if the received packet is a multicast packet, setting the second field of a multicast FIFO node in the global output queue according to the destination ports of the multicast packet, wherein the multicast FIFO node is regarded as the FIFO node relating to the received packet enqueued into the global output queue; and setting the first field and the second field of a last unicast FIFO node in each port output queue so as to indicate how many multicast packets following a unicast packet related to the last unicast FIFO node in each port output queue are to be skipped and dequeued, respectively;

when the received packet is the unicast packet and is being processed, reading the first field and the second field in the unicast FIFO node corresponding to the unicast packet and sending out the unicast packet; and sending out or skipping at least a multicast packet following the received packet according to the first field and the second field of the unicast FIFO node and the second field of the multicast FIFO node related to the multicast packet following the received packet.

2. The method according to claim 1, wherein each FIFO node further comprises a third field, and the third field is 0 when the received packet is unicast packet and the third field is 1 when the packet is multicast packet.

3. The method according to claim 1, wherein the step of setting the first field and the second field of the last unicast FIFO node in each port output queue comprises:

incrementing the first field of the last unicast FIFO node by 1 if the corresponding port output queue is not one of the destination ports of the received multicast packet and the second field of the last unicast FIFO node is 0;

incrementing the second field of the last unicast FIFO node by 1 if the corresponding port output queue is not one of the destination ports of the received multicast packet and the second field of the last unicast FIFO node is not 0; and incrementing the second field of the last unicast FIFO node by 1 if the output queue is one of the destination ports of the multicast packet.

4. The method according to claim 1, wherein the step of reading the first field and the second field of the unicast FIFO node comprises:

reading the first field and the second field of the unicast FIFO node into a first register and a second register.

5. The method according to claim 4, wherein the step of sending out or skipping at least the multicast packet following the received packet comprises:

skipping m multicast packets from the global output queue wherein m, being 0 or a natural number, is the value in the first register; and sending out or skipping n multicast packets from the global output queue wherein n, being 0 or a natural number, is the value in the second register.

6. The method according to claim 5, wherein if the second field of the multicast FIFO node following the received packet directs that the port output queue of the received packet is one of the destination ports of the multicast packet, one of the n multicast packets is sent out, and otherwise, one of the n multicast packets is skipped.

7. The method according to claim 6, wherein the step of sending out at least the multicast packet following the received packet comprises:

releasing the multicast FIFO node related to the multicast packet following the received packet if the second field of the multicast FIFO node comprises only one bit of 1;

clearing one related bit if the second field of the multicast FIFO node comprises two or more bits of 1; and releasing the corresponding FIFO block when all multicast FIFO nodes in the corresponding FIFO block are all released.

8. The method according to claim 1, wherein the step of sending out the unicast packet further comprises:

releasing the unicast FIFO node;

releasing the FIFO block when all unicast FIFO nodes in the FIFO block are all released.

9. The method according to claim 1, wherein each port output queue comprises a first head pointer pointing to one of the unicast FIFO nodes in the port output queue.

10. The method according to claim 1, wherein each port output queue comprises a first tail pointer pointing to one of the unicast FIFO nodes in the port output queue.

11. The method according to claim 1, wherein the global output queue comprises a plurality of second head pointers and a second tail pointer, wherein each second head pointer is one-to-one related to each port output queue and points to one of the multicast FIFO nodes in the global output queue related to each port output queue; and the second tail pointer points to one of the multicast FIFO nodes in the global output queue.

12. An output queuing method for forwarding packets in a switch network, the switch network containing a plurality of ports, each port corresponding to a port output queue, a global output queue shared by all port output queues, the packets being of the type of unicast or multicast, the output queuing method comprising:
   detecting the type of a receiving packet;
   if the type of the receiving packet is unicast, allocating the receiving packet into the port output queue by enqueuing a unicast node corresponding to the receiving packet into the port output queue, wherein the unicast node comprises a multicast count field and the multicast count field is initialized for counting how many multicast nodes corresponding to multicast packets that follow the receiving packet are enqueued into the global output queue;
   if the type of the receiving packet is multicast, allocating the receiving packet into the global output queue by enqueuing a multicast node corresponding to the receiving packet into the global output queue, and by setting, for each of the port output queues, a multicast count field of a unicast node which is last enqueued to indicate how many multicast nodes corresponding to multicast packets that follow a corresponding unicast packet of the last enqueued unicast node have been enqueued into the global output queue; and
   when the receiving packet is unicast and is to be transmitted:
      dequeuing the unicast node corresponding to the receiving packet from the port output queue;
      sending out the receiving packet; and
      determining whether to perform multicast packet forwarding from the global output queue according to the unicast node corresponding to the receiving packet.

13. An output queuing method for forwarding packets in a switching network having a plurality of ports, the method comprising:
   providing a plurality of port output queues, each port output queue corresponding to one of the ports for a plurality of unicast nodes to be enqueued in order to forward corresponding unicast packets, wherein each unicast node comprises a multicast count field and the corresponding unicast packet is destined to one of the ports;
   providing a global output queue shared by all of the port output queues for a plurality of multicast nodes to be enqueued in order to forward corresponding multicast packets, wherein each multicast packet is destined to corresponding ones of the ports, and the multicast node corresponding to the multicast packet comprises an output port field indicative of the corresponding ones of the ports;
   in response to an incoming packet,
      if the incoming packet is unicast, enqueuing a unicast node corresponding to the incoming packet into a corresponding one of the port output queues, wherein the multicast count field of the unicast node corresponding to the incoming packet is initialized for counting how many multicast nodes corresponding to multicast packets that follow the incoming packet are enqueued into the global output queue; and
      if the incoming packet is multicast,
         enqueuing a multicast node corresponding to the incoming packet into the global output queue; and
         for each of the port output queues, setting the multicast count field of a unicast node which is last enqueued to indicate how many multicast nodes corresponding to multicast packets that follow a corresponding unicast packet of the last enqueued unicast node have been enqueued into the global output queue;
   for each of the port output queues with a unicast node that is first enqueued,
      dequeuing the first enqueued unicast node from the port output queue;
      sending out a corresponding unicast packet of the first enqueued unicast node; and
      determining whether to perform multicast packet forwarding from the global output queue according to the first enqueued unicast node.

14. The method according to claim 13, wherein after determining whether to perform multicast packet forwarding from the global output queue, the method further comprises:
   if the multicast count field of the first enqueued unicast node indicates that at least a one multicast packet follows the corresponding unicast packet of the first enqueued unicast node, and if the output port field of a multicast node corresponding to the multicast packet which follows the corresponding unicast packet of the first enqueued unicast node indicates that the multicast packet of the multicast node is destined to at least one destination port to which the corresponding unicast packet of the first enqueued unicast node is destined:
      dequeuing the multicast node corresponding to the multicast packet which follows the corresponding unicast packet of the first enqueued unicast node; and
      sending out the multicast packet which follows the corresponding unicast packet of the first enqueued unicast node to the destination port.

15. The method according to claim 13, wherein after determining whether to perform multicast packet forwarding from the global output queue, the method further comprises:
   if the multicast count field of the first enqueued unicast node indicates that at least a one multicast packet follows the corresponding unicast packet of the first enqueued unicast node, and if the output port field of a multicast node corresponding to the multicast packet following the corresponding unicast packet of the first enqueued unicast node indicates that the multicast packet of the multicast node is not destined to the port to which the corresponding unicast packet of the first enqueued unicast node is destined,
      skipping at least the multicast node corresponding to the multicast packet following the corresponding unicast packet of the first enqueued unicast node.

16. The method according to claim 13, wherein each unicast node of each port output queue further comprises a skip count field for counting how many multicast packets following the corresponding unicast packet of the unicast node are enqueued into the global output queue but are not destined to the port to which the corresponding packet of the unicast node is destined.

17. The method according to claim 16, wherein after enqueuing the multicast node corresponding to the incoming packet into the global output queue, the method further comprises:

setting the skip count field of the last enqueued unicast node of each port output queue to indicate how many multicast nodes corresponding to multicast packets that follow the corresponding unicast packet of the last enqueued unicast node but are not destined to a destination port thereof have been enqueued into the global output queue.

18. The method according to claim 16, wherein after determining whether to perform multicast packet forwarding from the global output queue, the method further comprises:

if the skip count field of the first enqueued unicast node indicates that at least a multicast packet follows the corresponding unicast packet of the first enqueued unicast node but is not destined to a destination port to which the corresponding unicast packet of the first enqueued unicast node is destined, skipping at least the multicast node.

19. The method according to claim 13, wherein each of the global output queue and port output queues comprises at least one first-in-first-out, FIFO, block having a plurality of link nodes.

20. An apparatus for packet forwarding in a switching network having a plurality of ports, the apparatus comprising:

a queue control module for providing a plurality of port output queues for unicast packet forwarding in the corresponding ports, and providing a global output queue shared by all of the port output queues for multicast packet forwarding;

an input control module, in response to an incoming packet, for buffering the incoming packet and enqueuing a node corresponding to the incoming packet into one of the global output queue and the port output queues, wherein when the incoming packet is unicast, the node comprises a multicast count field and is enqueued into a corresponding one of the port output queues which corresponds to a destination port of the incoming packet, and when the incoming packet is multicast, the node comprises a port mask field indicative of destination ports of the incoming packet and is enqueued into the global output queue; and an output control module, for each of the port output queues, for dequeuing a node that is first enqueued, sending out a unicast packet corresponding to the first enqueued node, and determining whether to perform multicast packet forwarding from the global output queue according to the first enqueued node;

wherein when the node corresponding to the incoming packet is enqueued into is the corresponding one of the port output queues, the queue control module counts how many nodes corresponding to multicast packets that follow the incoming packet are enqueued into the global output queue;

wherein when the node corresponding to the incoming packet is enqueued into the global output queue, the queue control module, for each port output queue, sets the multicast count field of a node that is last enqueued into the port output queue to a value indicating how many nodes corresponding to multicast packets that follow the last enqueued node are enqueued into the global output queue.

21. The apparatus according to claim 20, wherein when the output control module dequeues the first enqueued node, the queue control module detects the multicast count field to determine whether to inform the output control module to dequeue a node corresponding to a multicast packet that follows the unicast packet corresponding to the first enqueued node from the global output queue.

22. The apparatus according to claim 21, wherein if the queue control module detects that the multicast packet which follows the unicast packet corresponding to the first enqueued node has a destination port identical to that of the unicast packet corresponding to the first enqueued node according to the port mask field of the node corresponding to the multicast packet, the queue control module informs the output control module to dequeue the node corresponding to the multicast packet which follows the unicast packet corresponding to the first enqueued node from the global output queue and to send out the multicast packet which follows the unicast packet corresponding to the first enqueued node.

23. The apparatus according to claim 21, wherein if the queue control module detects that the multicast packet which follows the unicast packet corresponding to the first enqueued node is not destined to a destination port to which the unicast packet corresponding to the first enqueued node is destined according to the port mask field of the node corresponding to the multicast packet, the queue control module informs the output control module to skip the node corresponding to the multicast packet from the global output queue.

* * * * *